United States Patent [19]
Fenn et al.

[11] Patent Number: 5,432,246
[45] Date of Patent: Jul. 11, 1995

[54] SILANE FUNCTIONAL OLIGOMER

[75] Inventors: David R. Fenn, Reading; Stephen P. Davies, High Wycombe, both of United Kingdom

[73] Assignee: Imperial Chemical Industries PLC, London, United Kingdom

[21] Appl. No.: 59,273

[22] Filed: May 11, 1993

[30] Foreign Application Priority Data

May 19, 1992 [GB] United Kingdom ................ 9210653

[51] Int. Cl.⁶ .............................................. C08G 77/26
[52] U.S. Cl. ...................................... 528/28; 528/38; 525/102
[58] Field of Search ................... 528/28; 525/100, 102

[56] References Cited

U.S. PATENT DOCUMENTS 5,130,402  7/1992  Akiyama ............................. 528/45

FOREIGN PATENT DOCUMENTS 60-044549  3/1985  Japan.

Primary Examiner—Ralph H. Dean
Attorney, Agent, or Firm—Cushman, Darby & Cushman

[57] ABSTRACT

A silane functional oligomer for use in the formulation of coating compositions having good clarity which has at east one hydrolyzable silane group and which is the reaction product of;
(i) a silane coupling agent having a hydrolyzable silane group and a secondary amine group,
(ii) a polyisocyanate having more than one tertiary isocyanate group, and containing at least 6% by weight of NCO groups, and
(iii) optionally, compound having single isocyanate reactive group.

12 Claims, No Drawings

SILANE FUNCTIONAL OLIGOMER

This invention relates to silane functional oligomers, to a method of making the oligomers and to coating compositions containing them. This application also relates to a process of coating using the coating compositions and to a coated substrate obtainable by the coating process.

Current commercial paint compositions used as coatings in automobile refinish applications comprise a combination of isocyanate oligomer and hydroxyl functional polymer. These clearcoat compositions are generally applied by spraying and have excellent application properties. The compositions have the ability to cure at or near ambient temperature in only a few hours and produce films having good properties such as good gloss, clarity, hardness and a high degree of resistance to cracking and to damage by solvents or water.

At present there is considerable interest in finding replacements for isocyanate based coating compositions. This interest has been primarily driven by concerns over the toxicity and sensitising effect of isocyanate-containing compositions particularly when they are applied by spraying. The problem is to find a replacement for the current isocyanate based compositions which is less toxic but which has equally good application and final film properties.

One attempt to solve the problem is disclosed in European Patent Application EP-A-0 267 698. This discloses a coating composition suitable for automobile refinish which comprises an oligomer having hydrolyzable silane groups and a polymer having hydrolyzable silane groups. The oligomer is made by first reacting a hydroxyalkyl acrylate with a polyisocyanate to produce an intermediate having terminal unsaturated groups followed by reaction of this intermediate with an aminosilane.

These compositions crosslink by coreaction between the hydrolyzable silane groups so as to form Si-O-Si crosslinks.

While these compositions are much less toxic than isocyanate based compositions and are satisfactory in many respects, they suffer from the problem that the water resistance of coatings produced from them is not entirely satisfactory. We believe that this is due to the presence of amine groups in the oligomer resulting from the reaction of the amine groups on the aminosilane with the unsaturated groups on the hydroxyalkyl acrylate.

Japanese Patent application 60-44549 discloses coating compositions comprising a silane functional urethane polymer and a silane functional vinyl resin. The silane functional urethane polymer is made by reacting an isocyanate functional urethane prepolymer with a silane coupling agent such as an aminosilane. Curing occurs as a result of reaction between the silane groups which form Si—O—Si crosslinks.

A problem with these compositions is that when the level of urea groups in the oligomer is high then films formed from them show poor clarity. This is a significant disadvantage when attempting to produce clearcoats on automobiles as any lack of clarity detracts from the final appearance of the refinished vehicle and is wholly unacceptable. Any Lack of clarity is also detrimental to the appearance of pigmented coatings.

We have discovered certain silane functional oligomers which can be used in coating compositions also containing a polymer having hydrolyzable silane groups. The coating compositions have a low toxicity and can be used to form cured films having good water resistance, clarity and hardness as well as other properties required of an automobile refinish coating.

According to the present invention there is provided a silane functional oligomer which has at least one hydrolyzable silane group and which is the reaction product of;
(i) a silane coupling agent having a hydrolyzable silane group and a secondary amine group,
(ii) a polyisocyanate having more than one tertiary isocyanate group, and containing at least 6% by weight of NCO groups, and
(iii) optionally, a compound having a single isocyanate-reactive group.

Preferably the oligomer has, on average, between 1 and 3 hydrolyzable silane groups, most preferably between 1.5 and 2.5 such groups.

Preferably the oligomer has a molecular weight of less than 4000, more preferably less than 2500.

A hydrolyzable silane group is a silane group having at least one substituent which can be hydrolyzed so as to give a hydroxy group on the silicon atom. Preferably the hydrolyzable silane group is of Formula (I);

In which $R^I$ and $R^{II}$ are independently $C_{1-6}$ alkyl, preferably methyl or ethyl, most preferably methyl, and a is 1 to 3, preferably 3.

The secondary amine group is preferably a group of Formula (II);

in which $R^{III}$ is $C_{1-6}$ alkyl, preferably methyl or ethyl and most preferably methyl.

Preferred silane coupling agents are those of formula (III);

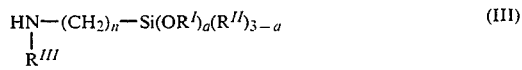

in which $R^{I-III}$ and a have the same meanings as in Formulae (I) and (II) and n is 1 to 6, preferably 3.

Examples of suitable silane coupling agents are N-methyl-3-aminopropyl trimethoxysilane and N-methyl-3-aminopropyl triethoxysilane. Such coupling agents are commercially available.

The tertiary isocyanate groups on the polyisocyanate are groups of Formula (IV);

in which $R^{IV}$ and $R^V$ are independently $C_{1-6}$ alkyl, preferably methyl. Preferably the polyisocyanate has no isocyanate groups other than tertiary isocyanate groups.

Preferably the polyisocyanate has an average of 2 or more tertiary isocyanate groups per molecule. More preferably the polyisocyanate has from 2 to 6 tertiary isocyanate groups and most preferably 3 such groups.

Preferably the polyisocyanate has 7 to 13% by weight of NCO groups.

One suitable polyisocyanate is a diisocyanate compound known as tetramethyl xylene diisocyanate which has the formula (V);

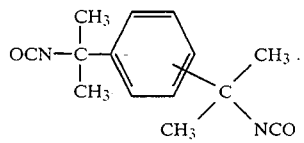

(V)

A polyisocyanate of formula (V) in which the tertiary isocyanate groups are predominantly meta, is commercially available under the trademark TMXDI from the American Cyanamid company.

Preferred polyisocyanates are the reaction product of diisocyanates such as TMXDI with a polyol. The polyol is a compound having two or more OH groups, preferably three to six OH groups and most preferably three OH groups. Examples of suitable polyols are trimethylol propane, pentaerithritol and glycerol.

These reaction products can be made by reacting the diisocyanate and the polyol in a ratio such that on average each OH group on the polyol reacts with one molecule of diisocyanate. This results in a polyisocyanate which in theory has the same number or isocyanate groups per molecule as the number of OH groups on each molecule of polyol.

Certain preferred polyisocyanates which are the reaction product of a diisocyanate with a polyol are commercially available under the trademark Cythane from the American Cyanamid company. For example Cythane 2601 is a 60% non-volatile content solution in butyl acetate of what is believed to be the adduct of one mole of trimethylol propane and three moles of an isocyanate of Formula (V). Thus Cythane 2601 predominantly has an average tertiary isocyanate functionality of three.

The isocyanate-reactive group on the compound (iii) can be any group which will react with a tertiary isocyanate group. Examples of isocyanate reactive groups are hydroxyl groups and amine groups.

Preferably the compound having a single isocyanate-reactive group is a monoalcohol. A monoalcohol is a compound having one OH group and no other groups which can react with either the polyisocyanate or the silane coupling agent. The monoalcohol is preferably a $C_{1-2}$ alkyl alcohol for example dodecanol or decanol, more preferably a $C_{1-6}$ alkyl alcohol such as hexanol, butanol, propanol, isopropanol, ethanol or methanol, and most preferably butanol.

The oligomer can be made by reacting together a silane coupling agent having a secondary amine group, a polyisocyanate having a tertiary isocyanate group, and optionally a compound having a single isocyanate-reactive group. The reaction is carried out so as to react the secondary amino groups of the aminosilane and any isocyanate-reactive group with the tertiary isocyanate group of the polyisocyanate.

The ratios of the silane coupling agent, polyisocyanate and any compound having a single isocyanate-reactive group are chosen so as to give an oligomer having an average of at least one hydrolyzable silane group per molecule.

The reaction can be carried out by mixing the components in any order. The reaction can be carried out either using the neat components or in solution in a suitable solvent.

Preferably the reaction is carried out in a suitable solvent. Suitable solvents include any liquids which dissolve the components but which do not react with them. Examples of suitable solvents include ketonic solvents such as acetone or methylethyl ketone, ester solvents such as butyl acetate or ethyl acetate and aromatic solvents such as toluene or Solvesso 100 (Trademark, a mixture of $C_9$ aromatic hydrocarbons available from Exxon).

The reaction can be carried out at ambient or moderately elevated temperature. Preferably the reaction is carried out at moderately elevated temperature, for example between 25° and 140° C.

A catalyst for the reaction between the tertiary isocyanate groups, the secondary amine groups and any isocyanate-reactive groups can be included. Suitable catalysts are tertiary amines, such as triethylamine and tin catalysts such as dibutyl tin dilaurate.

A preferred process when a monoalcohol is included in the preparation comprises the steps of;
(i) reacting the silane coupling agent with the polyisocyanate in solution in a suitable solvent in a ratio so as to form an intermediate having tertiary isocyanate groups, and
(ii) adding an excess of the monoalcohol so as to ensure that no isocyanate groups remain.

This preferred process ensures that no isocyanate groups are present on the oligomer produced, while ensuring that the only reagent which remains in excess is the low toxicity inexpensive monoalcohol.

The oligomers of the invention can be used in conjunction with a silane functional polymer to produce coating compositions.

According to the present invention there is provided a coating composition comprising a silane functional oligomer as described above and a silane functional polymer.

Preferably the composition comprises amounts of silane functional oligomer and silane functional polymer such that the ratio of the number of silane groups on the oligomer to the number of silane groups on the polymer is in the range 1:10 to 10:1, more preferably 1:5 to 6:1, most preferably 1:2 to 4:1, especially 1:1 to 2:1.

The silane functional polymer is a polymer having hydrolyzable silane groups. Preferably the hydrolyzable silane groups are of formula (I).

Preferably the silane functional polymer has an average of more than one hydrolyzable silane group per molecule.

The silane functional polymer can be an addition polymer, a polyester polymer or a polycarbonate polymer. Preferably it is an addition polymer.

When the silane functional polymer is an addition polymer it preferably has a number average molecular weight of 1500 to 20000, more preferably 1500 to 7000 and most preferably 1500 to 4000.

When the silane functional polymer is an addition polymer it comprises functional units and structural units.

The functional units are derived from unsaturated monomers having hydrolyzable silane groups. Examples of monomers having hydrolyzable silane groups are acrylate or methacrylate esters of Ω-hydroxyalkyl silanes, such as 3-methacryloxypropyl trimethoxy silane.

The structural units are derived from unsaturated monomers which do not have reactive functional groups. Examples of monomers not having reactive functional groups are styrene and $C_{1-10}$ alkyl or cycloalkyl acrylates or methacrylates, for example methyl methacrylate, ethyl methacrylate, butyl methacrylate, isobornyl methacrylate, ethyl acrylate, butyl acrylate, hexyl acrylate, and 2-ethylhexyl acrylate. Preferred monomers are $C_{1-6}$ alkyl acrylates and methacrylates, particularly butyl acrylate and methyl methacrylate and isobornyl methacrylate.

Other monomers can be included which have other functional groups. Examples of other functional groups are hydroxyl groups, acid groups and epoxy groups. Examples of monomers having such groups are acrylic acid, methacrylic acid, hydroxyethyl methacrylate, hydroxy poly(ethylene glycol) methacrylate, hydroxypropyl methacrylate and glycidyl methacrylate.

The addition polymers can be made by polymerising a suitable monomer mixture in the presence of a polymerisation initiator. Examples of suitable polymerisation initiators include azo initiators such as 2,2-azobis(2-methyl butyronitrile) and peroxide initiators such as benzoyl peroxide.

The polymerisation can be carried out by conventional processes including solution, suspension or dispersion polymerisation. Preferably the addition polymer is made by polymerisation in solution in a suitable non-reactive solvent. Such solution polymerisation processes are well known in the art. Examples of suitable polymerisation processes are given in European Patent Application EP-A-0 267 698.

Suitable solvents include those described above in relation to the preparation of the oligomer. In order to polymerise the monomers in solution the functional monomers, structural monomers, any other monomers and a polymerisation initiator are dissolved in the solvent and the temperature of the solution is raised to a temperature at which the initiator generates free radicals so as to polymerise the monomers. The monomers and initiator can be added to the solvent simultaneously, but using separate feeds and slowly over a period of time so as to control the rate of polymerisation.

A chain transfer agent can be included in the polymerisation mixture to control the molecular weight of the polymer. Examples of suitable chain terminating agents are thiol compounds such as 3-mercaptopropyl trimethoxy silane, 3-mercaptopropyl methyldimethoxy silane and octyl mercaptan.

The compositions of the invention can be made by mixing the silane functional oligomer with the silane functional polymer.

The components can be mixed in the presence of a suitable solvent. A suitable solvent is a solvent which dissolves both the polymer and the oligomer but which does not react with either of them or reacts reversibly with them. Examples of suitable solvents are aromatic hydrocarbons, such as Solvesso 100, toluene and xylene, alcohols such as butanol or isopropanol, esters such as butyl acetate or ethyl acetate, ketones such as acetone or methylethyl ketone, ethers or ether-alcohols. Such solvents can also be added to the mixed composition. The presence of the solvent makes the components easier to mix together and also can be used to adjust the application properties of the composition, such as flow and viscosity.

The amount of solvent will depend on the molecular weight of the components, particularly the polymer, and the intended application method. The correct amount of solvent is easily determined by the skilled man so as to achieve the appropriate viscosity for mixing the components and for the application method to be used. For example, a composition suitable for spray application preferably contains 30–85% by weight of solvent.

A catalyst can be added to the composition so as to accelerate the crosslinking reaction between the silane groups. Suitable catalysts are well known in the art and include tin catalysts such as dibutyltin dilaurate, dibutyltin oxide and tin octoate and amines such as triethylamine and triethylene diamine. Other additives can be added to the compositions such as pigments, UV absorbers, flow aids, and water scavengers commonly known for use in coating compositions.

The compositions of the invention can be used in a coating process which comprises applying a layer of the composition to a surface of a substrate and then causing or allowing the layer to cure.

The compositions can be applied to the surface by any suitable application method such as brushing, rollercoating, curtain-coating, dip coating, or spray, preferably spray.

The compositions can be allowed to cure at ambient temperature, for example 15°–25° C. Alternatively they can be caused to cure by subjecting the coated substrate to moderately elevated temperature for example 30° to 90° C.

The time required for the compositions to cure varies according to the temperature at which curing occurs. Generally the compositions achieve an acceptable degree of cure for handling purposes within ½ to 24 hours depending on the temperature at which they are cured.

Preferably the compositions are used as the final clearcoating in a multilayer coating process, or basecoat-clear process. Such a basecoat-clear process is particularly useful for refinishing motor vehicles. The process comprises first applying a layer of pigmented basecoat coating composition to the surface, so as to form a pigmented coating film, subsequently applying an unpigmented layer of the composition of the present invention and allowing or causing this subsequent layer to cure. The pigmented basecoat can be waterborne (for example of the type disclosed in European Patent Application EP-A-0 300 612), or a conventional solventborne basecoat.

The following examples, in which all parts are by weight, illustrate the invention;

EXAMPLES

1. POLYMERS 1.1 Polymer 1

A mixture of methyl methacrylate (3090.8 parts), butylacrylate (427.8 parts), 3-mercaptopropyl methyldimethoxysilane (available under the trademark "Dynasylan 3403 from Hüls; 200.0 parts), 3-methacryloxypropyl trimethoxysilane (available under the trademark "Z6030" from Dow Corning; 479.8 parts), and 2,2-azobis(2-methyl butyronitrile) (available under the trademark "Vazo 67" from DuPont; 200 parts) were slowly added over a period of three hours with stirring to a refluxing mixture of butyl acetate (800 parts) and an aromatic hydrocarbon solvent having a boiling range of 165° to 179° C. (available under the trademark "Solvesso 100" from Exxon Chemicals; 800.6 parts) under a nitrogen blanket.

The mixture was cooled to 110° C. and Vazo 67 (10 parts) was added. The mixture was stirred at 110° C. for one hour.

1.2. Polymer 2

A mixture of methyl methacrylate (2282.3 parts), butylacrylate (436.6 parts), isobornyl methacrylate (799.7 parts), 3mercaptopropyl trimethoxysilane (available under the trademark "A189" from Hüls; 200.0 parts), 3-methacryloxypropyl trimethoxysilane; 479.8 parts), and 2,2-azobis(2-methyl butyronitrile) (available under the trademark "Vazo 67" from DuPont; 200 parts) were slowly added over a period of three hours with stirring to a refluxing mixture of butyl acetate (800.6 parts) and Solvesso 100 (800.6 parts) under a nitrogen blanket.

The mixture was cooled to 110° C. and Vazo 67 (10 parts) was added. The mixture was stirred at 110° C. for one hour.

1.3. Polymer 3

A mixture of methyl methacrylate (1719.4 parts), n-octyl mercaptan (86.4 parts), 3-methacryloxypropyl trimethoxysilane; 613.9 parts), and 2,2-azobis(2-methyl butyronitrile) (available under the trademark "Vazo 67" from DuPont; 116.7 parts) were slowly added over a period of three hours with stirring to a refluxing mixture of butyl acetate (466.7 parts) and Solvesso 100 (466.7 parts) under a nitrogen blanket.

The mixture was cooled to 110° C. and Vazo 67 (5.8 parts) was added. The mixture was stirred at 110° C. for one hour.

2. OLIGOMERS

2.1. Oligomer 1 (Comparative)

N-methyl-3-aminopropyltrimethoxysilane (available under the trademark "Dynasylan 1110" from Hüls; 86.5 parts) was added over a period of 30 minutes to a mixture of butyl acetate (106.2 parts) and a 90 % non-volatile content solution in a 1:1 mixture of butyl acetate and Solvesso 100 of the isocyanurate trimer of hexamethylene diisocyanate (available under the trademark "HDT 90" from Rhone Poulenc; 141.2 parts) at a temperature of 40° C. under nitrogen. The temperature was raised to 60° C. and the mixture was stirred for 30 minutes. n-Butanol (49.6 parts) was added and the temperature was raised to reflux. Reflux temperature was maintained until no peak at 2250cm$^{-1}$ in the Infra-red spectrum, corresponding to the isocyanate group, could be detected.

2.2. Oligomer 2

N-methyl-3-aminopropyltrimethoxysilane (available under the trademark "Dynasylan 1110" from Hüls; 489.1 parts) was added over a period of 30 minutes to a mixture of butyl acetate (201.3 parts) and a 60% non-volatile content solution in butyl acetate of the adduct of one mole of trimethylolpropane and three moles of tetramethyl xylene diisocyanate (available under the trademark "Cythane 2601" from American Cyanamid; 2027.5 parts) at a temperature of 40° C. under nitrogen. The temperature was raised to 60° C. and the mixture was stirred for 30 minutes. n-Butanol (282.0 parts) was added and the temperature was raised to reflux. Reflux temperature was maintained until no peak at 2250 cm$^{-1}$ in the infra-red spectrum, corresponding to the isocyanate group, could be detected.

2.3. Oligomer 3

N-methyl-3-aminopropyltrimethoxysilane (available under the trademark "Dynasylan 1110" from Hüls; 34.0 parts) was added over a period of 30 minutes to a mixture of butyl acetate (22.7 parts) and a 60% non-volatile content solution in butyl acetate of the adduct of one mole of trimethylolpropane and three moles of tetramethyl xylene diisocyanate (available under the trademark "Cythane 2601" from American Cyanamid; 93.4 parts) at a temperature of 60° C. The mixture was stirred at 60° C. until no peak at 2250 cm$^{-1}$ in the infrared spectrum, corresponding to the isocyanate group, could be detected.

2.4 Oligomer 4 (Comparative)

N-methyl-3-aminopropyltrimethoxysilane (available under the trademark "Dynasylan 1110" from Hüls; 45.5 parts) was added over a period of 30 minutes to a mixture of butyl acetate (55.1 parts) and a 90% non-volatile content solution in a 1:1 mixture of butyl acetate and Solvesso 100 of the isocyanurate trimer of hexamethylene diisocyanate (available under the trademark "HDT 90" from Rhone Poulenc; 49.5 parts) at a temperature of 60° C. The mixture was stirred at 60° C. until no peak at 2250 cm$^{-1}$ in the infra-red spectrum, corresponding to the isocyanate group, could be detected.

3 COATING COMPOSITIONS

Coating compositions were made up by mixing various combinations of polymers 1 to 3 and oligomers 1 to 4. A quantity of butyl acetate solvent was added to each composition together with a small amount of dibutyltin dilaurate catalyst. The silane ratio given with each one is the ratio of the number of silane groups on the oligomer to the number of silane groups on the polymer. All parts are by weight of solution as made in the examples above.

| 3.1 Composition 1 | |
|---|---|
| Polymer 1 | 7.6 parts |
| Oligomer 2 | 5.13 parts |
| Butyl acetate | 7.23 parts |
| Dibutyltin dilaurate | 0.04 parts |
| Silane ratio 1.12:1 | |
| 3.2 Composition 2 (Comparative) | |
| Polymer 1 | 7.6 parts |
| Oligomer 1 | 5.13 parts |
| Butyl acetate | 7.23 parts |
| Dibutyltin dilaurate | 0.04 parts |
| Silane ratio 1.56:1 | |
| 3.3 Composition 3 | |
| Polymer 2 | 7.26 parts |
| Oligomer 3 | 5.53 parts |
| Butyl acetate | 7.17 parts |
| Dibutyltin dilaurate | 0.04 parts |
| Silane ratio 1.81:1 | |
| 3.4 Composition 4 (Comparative) | |
| Polymer 2 | 7.26 parts |
| Oligomer 4 | 5.53 parts |
| Butyl acetate | 7.17 parts |
| Dibutyltin dilaurate | 0.04 parts |
| Silane ratio 2.42:1 | |
| 3.5 Composition 5 | |
| Polymer 3 | 7.26 parts |
| Oligomer 3 | 5.53 parts |
| Butyl acetate | 7.17 parts |
| Dibutyltin dilaurate | 0.04 parts |
| Silane ratio 1.25:1 | |
| 3.6 Composition 6 (Comparative) | |
| Polymer 3 | 7.26 parts |
| Oligomer 4 | 5.53 parts |
| Butyl acetate | 7.17 parts |
| Dibutyltin dilaurate | 0.04 parts |
| Silane ratio 1.68:1 | |
| 3.7 Composition 7 | |

-continued

| | | |
|---|---|---|
| Polymer 1 | 10.81 | parts |
| Oligomer 2 | 1.39 | parts |
| Butyl acetate | 7.76 | parts |
| Dibutyltin dilaurate | 0.04 | parts |
| Silane ratio 1:4.68 | | |
| 3.8 Composition 8 (Comparative) | | |
| Polymer 1 | 10.81 | parts |
| Oligomer 1 | 1.39 | parts |
| Butyl acetate | 7.76 | parts |
| Dibutyltin dilaurate | 0.04 | parts |
| Silane ratio 1:3.36 | | |
| 3.9 Composition 9 | | |
| Polymer 1 | 3.00 | parts |
| Oligomer 2 | 10.50 | parts |
| Butyl acetate | 6.46 | parts |
| Dibutyltin dilaurate | 0.04 | parts |
| Silane ratio 5.59:1 | | |
| 3.10 Composition 10 (Comparative) | | |
| Polymer 1 | 3.00 | parts |
| Oligomer 1 | 10.50 | parts |
| Butyl acetate | 6.46 | parts |
| Dibutyltin dilaurate | 0.04 | parts |
| Silane ratio 8.09:1 | | |

4. TESTING.

The above Compositions 1 to 10 were spread onto glass using a 250μ block spreader, and left at room temperature overnight to cure.

Compositions 1, 3, 5, 7 and 9, according to the invention, gave clear films while comparative compositions 2, 4, 6, 8 and 10 gave cloudy films.

We claim:

1. A silane functional oligomer which has at least one hydrolyzable silane group and which is the reaction product of;
   (i) a silane coupling agent having a hydrolyzable silane group and a secondary amine group,
   (ii) a polyisocyanate having more than one tertiary isocyanate group, and containing at least 6% by weight of NCO groups, which is the reaction product of tetramethylxylene diisocyanate and trimethylol propane, and
   (iii) optionally, a compound having a single isocyanate-reactive group.

2. An oligomer as claimed in claim 1 which has on average between 1 and 3 hydrolyzable silane groups.

3. An oligomer as claimed in claim 1 or claim 2 in which the silane coupling agent is of Formula (III);

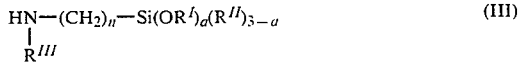

in which $R^I$, $R^{II}$ and $R^{III}$ are independently $C_1$ to 6 alkyl, n is 1 to 6 and a is 1 to 3.

4. An oligomer as claimed in any one of claim 1 in which the polyisocyanate has an average of 2 or more tertiary isocyanate groups.

5. An oligomer as claimed in claim 1 in which the compound having a single isocyanate-reactive group is a monoalcohol.

6. A process for making an oligomer as claimed in claim 1 which comprises reacting together the silane coupling agent, the polyisocyanate and, optionally, the compound having a single isocyanate-reactive group.

7. A coating composition comprising an oligomer as claimed in claim 1 and a silane functional polymer.

8. A coating composition as claimed in claim 7 in which the polymer is an addition polymer.

9. A composition as claimed in claim 7 or claim 8 in which the components are present in amounts such that the ratio of the number of silane groups on the oligomer to the number of silane groups on the polymer is in the range 10:1 to 1:10.

10. A method of making a coating composition as claimed in claim 7 which comprised mixing an oligomer as claimed in claim 1 with a silane functional polymer.

11. A coating process which comprises applying a layer of a coating composition as claimed in claim 7 to a surface of a substrate and the causing or allowing the layer to cure.

12. A coated substrate obtained by the process of claim 11.

* * * * *